US009566727B2

(12) United States Patent
Heintz

(10) Patent No.: US 9,566,727 B2
(45) Date of Patent: Feb. 14, 2017

(54) DEVICE AND METHOD FOR TURNING SELVEDGES ON A CALENDER

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventor: David Heintz, Greenville, SC (US)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 232 days.

(21) Appl. No.: 14/372,293

(22) PCT Filed: Jan. 17, 2013

(86) PCT No.: PCT/EP2013/050774
§ 371 (c)(1),
(2) Date: Jul. 15, 2014

(87) PCT Pub. No.: WO2013/107786
PCT Pub. Date: Jul. 25, 2013

(65) Prior Publication Data
US 2015/0000828 A1 Jan. 1, 2015

(30) Foreign Application Priority Data

Jan. 19, 2012 (FR) ..................... 12 50551

(51) Int. Cl.
*B29C 43/24* (2006.01)
*B29C 43/28* (2006.01)
(Continued)

(52) U.S. Cl.
CPC ............... *B29C 43/24* (2013.01); *B29C 43/28* (2013.01); *B29C 53/04* (2013.01); *B29C 53/043* (2013.01);
(Continued)

(58) Field of Classification Search
CPC ... B29D 30/38; B29D 30/46; B29D 2030/381; B29C 37/02; B29C 43/24; B29C 43/28; B29C 53/04; B29C 53/043; B29C 70/50; B29C 70/504; B29L 2030/003
See application file for complete search history.

(56) References Cited

U.S. PATENT DOCUMENTS 2,038,328 A * 4/1936 Wells ...................... B29C 67/24
156/168
2005/0205191 A1 9/2005 Sukuki

FOREIGN PATENT DOCUMENTS

CA 970518 A 7/1975
CN 1669782 A 9/2005
(Continued)

OTHER PUBLICATIONS

International Search Report for PCT/EP2013/050774 dated Apr. 3, 2013.
(Continued)

Primary Examiner — Michael Tolin
(74) Attorney, Agent, or Firm — Dickinson Wright PLLC

(57) ABSTRACT

Method of calendering the continuous ply of reinforcing threads, during which: said ply of reinforcing threads is positioned between a continuous upper sheet of rubber and a continuous lower sheet of rubber, said sheets of rubber having a width greater than the width of the ply of reinforcing threads, so that the two lateral parts of said sheets of rubber which are not vertically aligned with the ply of reinforcing threads form selvedges. The assembly formed in
(Continued)

the preceding step is introduced into the nip of a calendering comprising at least two rolls, so as to cause the rubber to penetrate the spaces between the reinforcing threads. Prior to the ply of reinforcing threads and the sheets of rubber being introduced into the nip of the calender, the two selvedges of one of the sheets of rubber are turned up on themselves.

9 Claims, 3 Drawing Sheets

(51) Int. Cl.
 *B29C 53/04* (2006.01)
 *B29C 70/50* (2006.01)
 *B29D 30/38* (2006.01)
 B29L 30/00 (2006.01)
(52) U.S. Cl.
 CPC ............ *B29C 70/504* (2013.01); *B29D 30/38* (2013.01); *B29D 2030/381* (2013.01); *B29L 2030/003* (2013.01)

(56) References Cited

FOREIGN PATENT DOCUMENTS

| CN | 101394951 A | 3/2009 |
| DE | 102006014142 | 10/2007 |
| EP | 1577121 A2 | 9/2005 |

OTHER PUBLICATIONS

A Chinese Office Action issued on Apr. 8 for CN100738. Dated Apr. 8, 2015.

\* cited by examiner

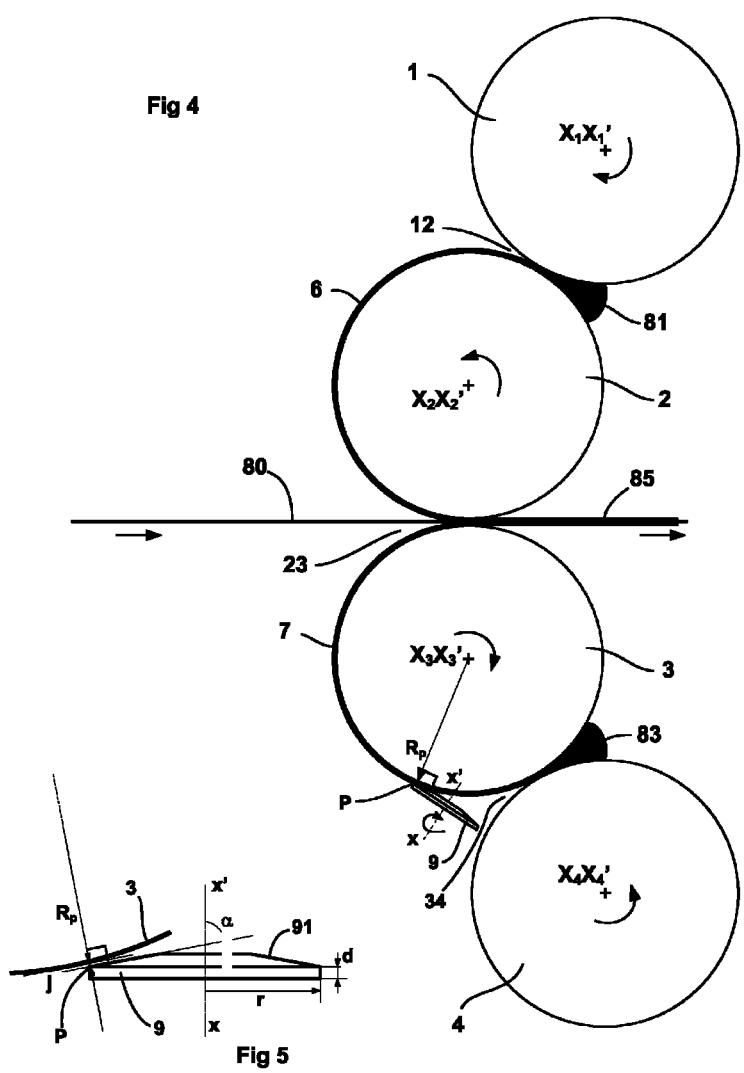

DEVICE AND METHOD FOR TURNING SELVEDGES ON A CALENDER

This application is a 371 national phase entry of PCT/EP2013/050774, filed 17 Jan. 2013, which claims benefit of FR 1250551, filed 19 Jan. 2012, the entire contents of which are incorporated herein by reference for all purposes.

BACKGROUND

1. Field

The disclosure relates to the field of the manufacture of rubber items intended for example to form the reinforcing elements of a tire.

2. Description of Related Art

These reinforcing elements as a general rule are made up of lengths of reinforcing thread coated in rubber, said lengths being parallel to one another and making a given angle with the circumferential direction of the tire. Thus, in a radial tire, the carcass reinforcing threads make an angle of 90° with the circumferential direction. Likewise, the reinforcing plies that make up the crown belt are made up of reinforcing threads that make an angle comprised between 25° and 45° with the circumferential direction. Finally, the hooping plies, when these are not obtained as continuous strips wound in a number of turns, are formed of lengths of reinforcing threads wound over one or two turns and forming a zero angle with the circumferential direction.

It is fairly common practice in the tire industry for these various components themselves to be produced by cutting them from continuous plies, formed of continuous reinforcing threads coated with rubber, which are parallel to one another and make a zero angle with the longitudinal direction of the said continuous ply, also referred to as a straight thread ply.

A straight thread ply is manufactured as a general rule using a calender comprising at least two rotary calendering rolls, through the nip between which a ply of continuous reinforcing threads evenly spaced apart and interposed between two continuous sheets of rubber passes. As they pass through the nip between the calendering rolls, the sheets of rubber are pressed against one another and feed the spaces between the reinforcing threads to form a composite assembly of reinforcing threads and of rubber.

In order to ensure good distribution of material, the sheets of rubber have a width slightly greater than the width of the ply of reinforcing threads. The result of this is that lateral selvedges are formed where the sheets of rubber do not trap any thread between them. Therefore, a selvedge cutting and recycling device is provided downstream of the calendering means so that the composite ply can be cut to the precise width of the ply of reinforcing threads.

However, it is found that the pressing-together of the sheets of rubber at the selvedges is achieved imperfectly quite simply because of the lack of volume of reinforcing threads in this zone. This imperfect pressing results in poor cohesion of the sheets of rubber at the selvedges, leading to irregularities at the cutting device intended to remove the selvedges.

SUMMARY

It is an object of the invention to provide a novel solution to this problem.

An embodiment of the invention relates to a method of calendering a continuous ply of reinforcing threads that involves the steps during which:

said ply of reinforcing threads is positioned between a continuous upper sheet of rubber and a continuous lower sheet of rubber, said sheets of rubber having a width greater than the width of the ply of reinforcing threads, so that the two lateral parts of said sheets of rubber which are not vertically aligned with the ply of reinforcing threads form selvedges the assembly formed in the preceding step is introduced into the nip of a calender comprising at least two rolls, so as to cause the rubber to penetrate the spaces between the reinforcing threads.

This method is characterized in that, prior to the ply of reinforcing threads and the sheets of rubber being introduced into the nip of the calender, the two selvedges of at least one of the sheets of rubber are turned up on themselves.

By turning the selvedge up on itself the thickness of material entering the nip of the calender at the selvedge is increased and the pressing-together of the selvedges of the upper and lower sheets during passage through the nip of the calender is encouraged.

On leaving the nip the selvedges of the assembly are perfectly formed and the selvedges can be cut off more evenly and precisely as close as possible to the reinforcing threads positioned at the two transverse ends of the ply.

It is also found that by filling the volumes placed at the transverse ends of the ply of reinforcing threads, the quality of the bridge of rubber formed between the reinforcing threads at this precise location is improved.

Advantageously, the lateral selvedges are cut downstream of the nip formed by the rolls of the calender.

Advantageously, the fold in the selvedges is formed halfway across the respective width thereof.

Advantageously, the ply of reinforcing threads is formed by reinforcing threads that are parallel to one another and make a zero angle with the longitudinal direction of the said ply.

Another embodiment of the invention relates to novel turnup devices formed of rotary turnup discs installed axially on each side of the equator of a calendering roll. Each of the turnup discs comprises a conical surface, the generatrix of which form a given angle with respect to the axis of rotation of the turnup disc, and the said turnup disc is installed in such a way that the radially distal part of the conical surface of the turnup disc is substantially tangential to the surface of the calendering roll without coming into contact with the said surface.

Substantially tangential without coming into contact here means the fact that the generatrix of the conical surface are perpendicular to a radius of the roll passing through the radially distal point of the turnup disc and that this point is distant from the surface of said roll by a very small clearance advantageously comprised between 0.1 mm and 1 mm.

By making the sheet of rubber pass around the roll and by moving the turnup discs axially until they come into contact with each of the selvedges, the said selvedges are picked up and, under the effect of the rotation of the disc, the said selvedge is forced to fold over on itself towards the equator of the calendering roll.

Advantageously, the angle formed by a generatrix of the conical surface with the axis of rotation of the turnup disc can be comprised between 70° and 80°.

Advantageously, the diameter of a turnup disc can be comprised between 15 cm and 25 cm.

Advantageously the axes of rotation of the turnup discs are substantially perpendicular to the axis of rotation of the roll.

Advantageously, the position of the turnup means can be adjusted in a direction parallel to the axis of the rolls.

When use is made of the turnup discs according to an embodiment of the invention on a calender the method advantageously plans for the inclusion of the steps during which:

upstream of the nip of the calender a sheet of rubber is passed around one of the calendering rolls, the rotating turnup discs are brought axially closer to each of the selvedges, so that the selvedges are lifted up by the turnup disc and folded over on themselves towards the equator of the roll under the effect of the rotating of the said turnup disc Advantageously, the turnup discs are rotationally driven in such a way that the tangential velocity at the radially distal part of the turnup discs is directed substantially parallel to the axis of the roll in the direction of the equator of the said roll.

Advantageously, the turnup discs are rotationally driven in such a way that the circumferential velocity at the radially distal part of the turnup discs is greater than the circumferential velocity of the said calendering roll.

Advantageously, the turnup devices can be implemented on a calender comprising two additional rolls respectively collaborating with each of the two calendering rolls and forming, with each of these rolls, an upper nip and a lower nip, each intended to create a sheet of rubber continuously. In which case, the turnup means will be positioned downstream of the upper nip or lower nip.

BRIEF DESCRIPTION OF DRAWINGS

The description which follows is supported by FIGS. 1 to 5 in which:

FIG. 4 depicts a schematic side view of a calendering device comprising a turnup device according to an embodiment of the invention, FIG. 5 depicts a schematic view of the turnup device according to an embodiment of the invention.

DETAILED DESCRIPTION OF SPECIFIC EMBODIMENTS

Figure 1:
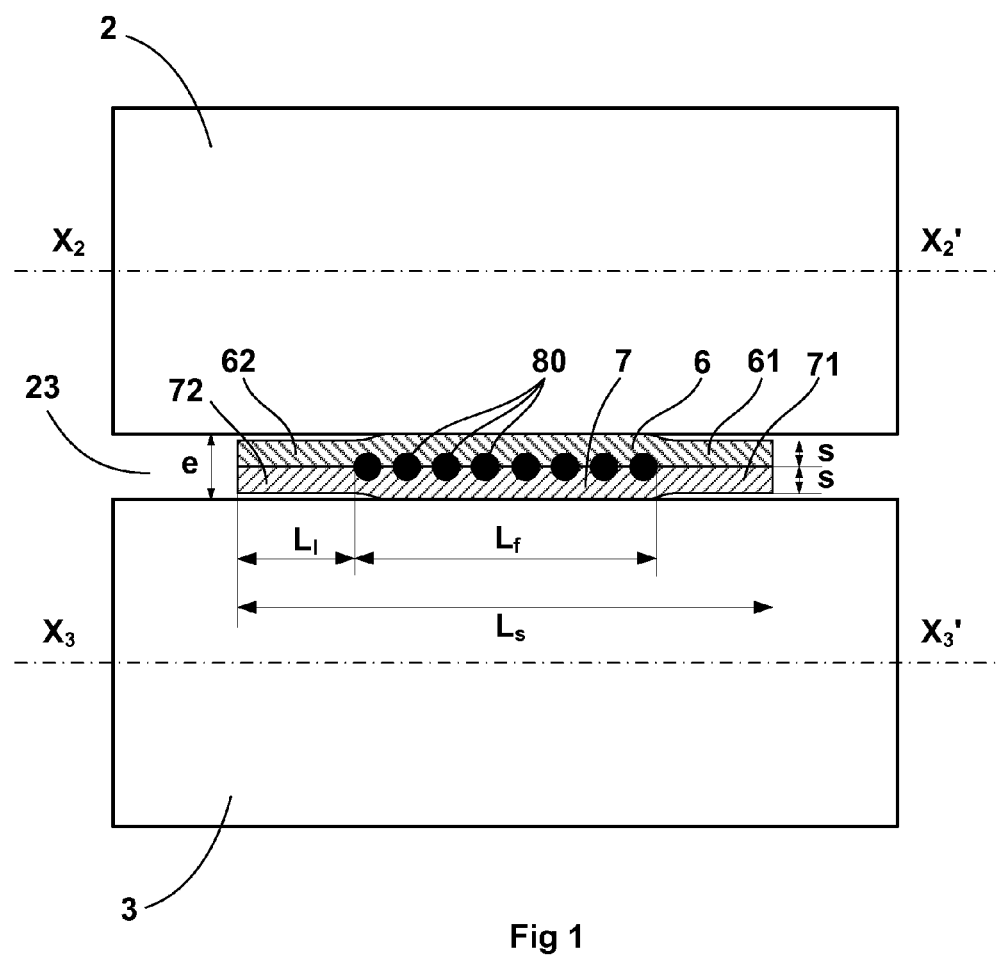
FIG. 1 depicts a face-on schematic view of a calendering device according to the known prior art.

The calendering device depicted in FIG. 1 comprises two calendering rolls 2 and 3 of which the axes, $X_2X_2'$ and $X_3X_3'$, respectively, are substantially mutually parallel.

The space between the two rolls defines a nip 23 through which an upper continuous sheet of rubber 6 and a lower continuous sheet of rubber 7 pass. A ply of reinforcing threads 80 is sandwiched between the two sheets of rubber and the pressure generated by the rolls at the nip forces the rubber to enter the empty spaces between the reinforcing threads so as to form, downstream of the nip, a composite product in which the reinforcing threads are coated with rubber.

It will be noted here that the ply of reinforcing threads 80 may be formed of reinforcing threads that are mutually parallel in the longitudinal direction, which is the general case, but may also comprise reinforcing threads with special layouts in relation to the longitudinal direction, if holding means such as weft threads or any other equivalent measure is/are adopted to allow the ply of reinforcing threads to pass continuously through the nip between the rolls of the calender.

Likewise, rubber here means any composition comprising a plastic mixture of unvulcanized diene or non-diene elastomer, associated with reinforcing fillers and with other elements such as vulcanization products or any other type of additive materials.

Each of the sheets of rubber has a width $L_s$ greater than the width $L_f$ of the ply of reinforcing threads, causing two lateral selvedges 61, 62 and 71, 72, respectively of width $L_i$, and in which there are no reinforcing threads, to appear.

The size of the nip e is adjusted so that the sheets of rubber of thickness s, under the effect of the pressure, fill the empty volume available between the reinforcing threads. It may be seen that, at the selvedges, in the absence of any volume of reinforcing threads, the pressure applied by the rolls to the sheets of rubber is light, or even zero. The result of this is that the jointing of the sheets of rubber at the selvedges is of poor quality, and this is liable to give rise to incidents during the operation of cutting off the selvedges downstream of the nip, as was already indicated in the introductory part of this application.

Figure 2:
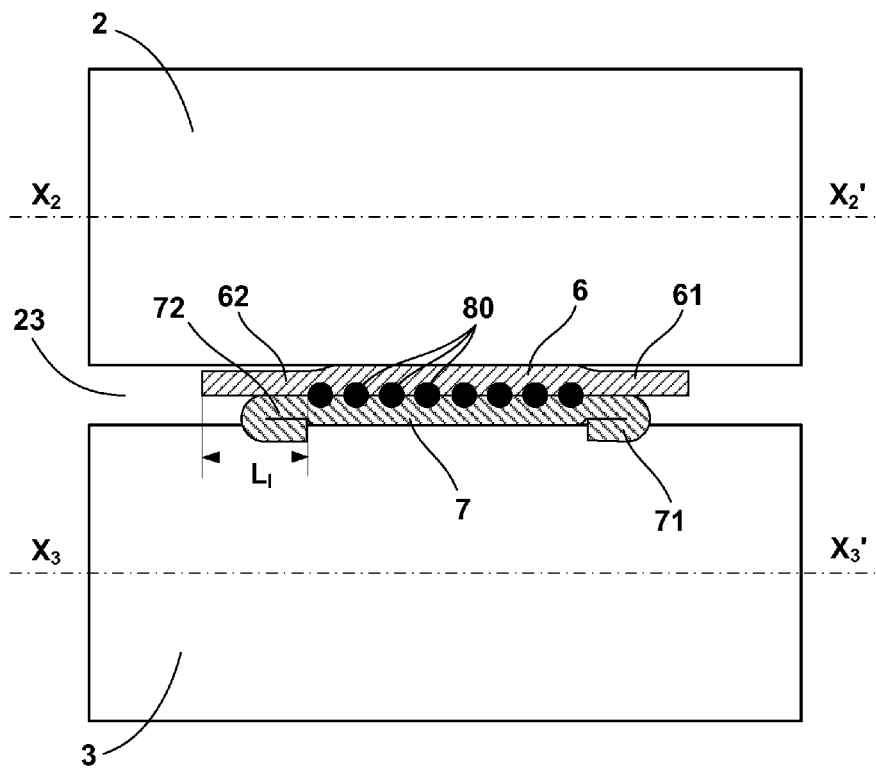
FIG. 2 depicts a face-on schematic view of the calender upstream of the nip situated between the two calendering rolls.

FIG. 2 illustrates a calendering device similar to the device described hereinabove. The method of implementing it however differs therefrom in that the selvedges 71 and 72 of the lower sheet of rubber 7 are folded over on themselves and fill the volumes positioned at the lateral ends of the ply of reinforcing threads 80.

Figure 3:
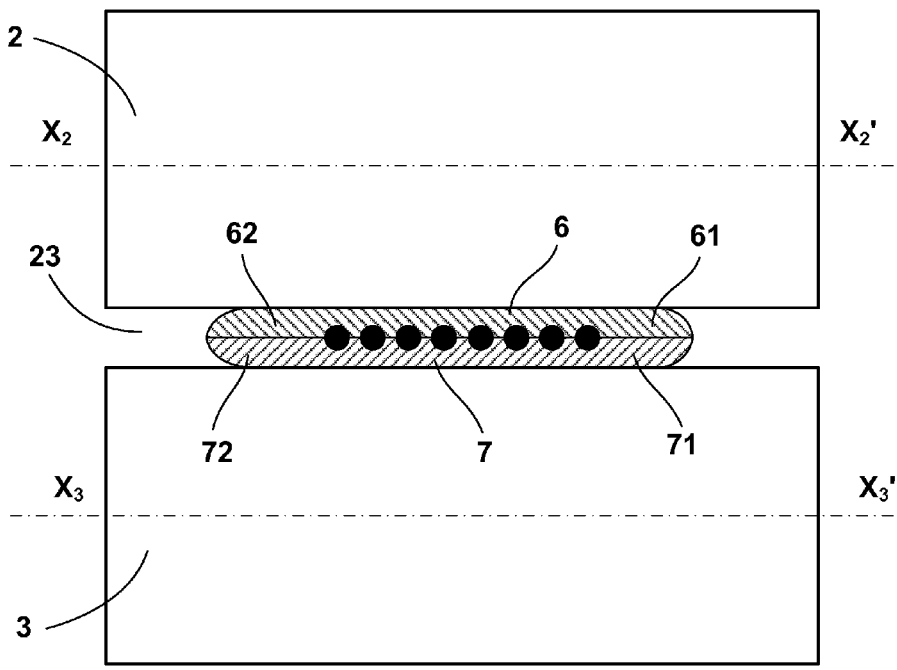
FIG. 3 depicts a face-on schematic view of the calender at the outlet of the nip situated between the two calendering rolls.

FIG. 3 illustrates the overall form of the composite downstream of the nip, where it can be seen that the selvedge 61 of the upper sheet of rubber 6 has jointed well with the selvedge 71 of the lower sheet of rubber 7; as likewise has the selvedge 62 with the selvedge 72.

Therefore it is necessary to provide means capable of turning the selvedges up on themselves upstream of the nip 23.

Pleating devices, known per se and formed of rollers aligned in the longitudinal direction, the axes of same forming angles with the plane of the ply that vary progressively so as to bring the selvedge in on itself could be adopted. However, such devices may present problems of centring in cases where the position of the fold relative to the ply of reinforcing threads needs to be adjusted accurately.

Hence, one subject of the invention is also to propose a particularly well suited means that allows this folding of the selvedges over on themselves to be carried out while at the same time having full control over the geometric position of the sheets of rubber in relation to the ply of reinforcing threads.

FIG. 4 illustrates a device comprising a calender formed of the rolls 2 and 3 similar to the calender illustrated in the preceding figures. This calender also comprises two additional rolls, respectively the rolls 1 and 4, with axes $X_1X_1'$ and $X_4X_4'$ substantially parallel to the axes $X_2X_2'$ and $X_3X_3'$ of the calendering rolls 2 and 3. The rolls 1 and 4 collaborate respectively with the rolls 2 and 3 with which they form an upper nip 12 and a lower nip 34.

This device, which is widely used within industry, allows simultaneous production of the continuous sheets of rubber 6 and 7 in the upper and lower nips 12 and 34, into the inlet of which is continuously fed a rubber-based material 81 and 83. The manufacture of the composite product formed of the assembly of the ply of reinforcing threads 80 and of the continuous sheets of rubber takes place as before in the nip 23 formed by the calendering rolls 2 and 3.

This device comprises turnup discs 9 positioned axially on each side of the lower sheet of rubber 7, downstream of the nip 34, and upstream of the nip 23 between the calendering rolls.

FIG. 5 is a detailed view of a turnup disc 9, which disc comprises a conical surface 91, the generatrix of which form a given angle α with respect to the axis of rotation xx' of the turnup disc. The angle α may beneficially be comprised between 70° and 80°. For example, good results have been obtained with an angle α of 78°. The cylindrical part of the turnup disc has a height d comprised between 10 mm and 30 mm. The diameter of the disc may beneficially be comprised between 15 cm and 25 cm. Because the turnup disc is intended to come into contact with the selvedges formed of a small-thickness rubber product, apparent sharp edges between the various faces of the turnup disc will be avoided.

As has been depicted in FIG. 4, the axis of the disc is positioned in such a way that, at the radially distal point P of the conical surface 91 of the turnup disc 9 and the roll 3, the radially distal part of the conical surface is substantially tangential to the surface of the calendering roll 3. At the point P, the generatrix of the conical surface is therefore perpendicular to the radius $R_p$ of the calendering roll 3.

Measures are also taken to ensure that the axis xx' of the turnup disc 9 is perpendicular to the axis $X_3X_3'$ of the roll 3.

As the circumferential velocities of the roll and of the turnup disc at the point P are neither equal nor collinear, the bringing of the turnup disc into contact with the surface of the calendering roll is avoided as far as possible. That means, as has been illustrated in FIG. 5, that, at the said point P, the conical surface is distant by a clearance J, which is as small as possible, comprised between 0.1 mm and 1 mm.

Also, it may prove beneficial to position each turnup disc on a mobile support (not depicted) able to move in a substantially radial direction of the calendering roll in order to allow the turnup disc to be brought nearer towards the surface of the said roll in an adjustable manner. As soon as initial contact with the disc is made, the support is made to move a small amount in the opposite direction over a distance corresponding to the desired clearance J. The same approach mechanism can also be used to make the system disengageable when use thereof is not required.

Likewise, these supports may be capable of movement in an axial direction, parallel to the axis of the calendering roll. The size of the turnup, and therefore the position of the fold, can then easily be adjusted by altering the axial position of the turnup disc or by altering the rotational velocity of the disc.

By positioning the fold halfway across the width of the selvedge, as has been illustrated in FIG. 2, distribution of rubbery material when the upper and lower sheets of rubber are brought into contact at the nip 23 is encouraged.

Each turnup disc is rotationally driven about its axis xx' by suitable means (not depicted). The velocity with which the disc rotates can beneficially be adjusted so that, at the point P, the circumferential velocity of the disc is at least greater than the circumferential velocity of the roll.

The direction of rotation of the turnup discs is determined so that, at the point of contact P, the tangential velocity of the disc is oriented axially towards the equator of the roll 3.

In order to turnup the selvedges, the turnup discs are brought axially closer to each of the selvedges until the conical part 91 lifts up the edge of the selvedge, so as to detach the said selvedge from the calendering roll. Under the effect of the rotation of the turnup disc, the turned up edge of the selvedge is then carried axially towards the equator of the roll 3.

The geometric values describing the turnup disc which have been given hereinabove are indicative values and a person skilled in the art will know how to adapt these parameters in order to vary the effects obtained. Thus, by increasing the angle α of the conical surface 91, the turning up effect is increased at the expense of the effect of lifting up the edge of the selvedge. Likewise, by increasing the diameter of the disc, for the same rotation velocity, or by increasing the rotation velocity, the tangential velocity at the point of contact P is increased and the formation of the fold is accelerated, always taking care, however, not to damage the selvedge under the effect of too violent an action.

It goes without saying that this device proves to be particularly advantageous in the case of a four-roll calender as described hereinabove, but that it is possible to implement the turnup device according to the invention on a calender comprising just two calendering rolls by adapting the feed into the calender so that one of the two sheets of rubber is passed, upstream of the nip 23, around the calendering roll on which the turnup discs are mounted.

The foregoing description proposes placing the turnup discs on the roll 3 in such a way as to turn up the selvedges of the lower sheet of rubber 7, but equivalent results would obviously be obtained if the selvedges of the upper sheet of rubber were turned up. It will also be noted, in the case where very large diameter reinforcing threads are being calendered, that it may prove beneficial to turn up both the selvedges of the lower sheet and also the selvedges of the upper sheet of rubber so as to increase the thickness of the volume of material arriving at the inlet to the nip 23.

The invention claimed is:

1. A method of calendering a continuous ply of reinforcing threads, comprising:
    positioning a continuous ply of reinforcing threads having spaces between adjacent reinforcing threads between a continuous upper sheet of rubber and a continuous lower sheet of rubber to form an assembly comprising the continuous ply of reinforcing threads and the sheets of rubber, said sheets of rubber having a width (Ls) greater than a width (Lf) of the continuous ply of reinforcing threads, so that two lateral parts of said sheets of rubber which are not vertically aligned with the ply of reinforcing threads form selvedges,
    introducing the assembly formed in the preceding step into a nip of a calender comprising at least two calendering rolls, to cause the rubber to penetrate the spaces between the reinforcing threads,
    turning up both selvedges of at least one of the sheets of rubber on themselves such that each turned up selvedge comprises a selvedge edge portion folding each selvedge so that there is contact between portions of selvedge,
    wherein the step of turning up both selvedges of at least one of the sheets of rubber on themselves is performed prior to the step of introducing the assembly into the nip of the calender.

2. The method according to claim 1, wherein a fold is formed in each respective turned up selvedge approximately halfway across the respective width thereof in the step of turning up both selvedges of at least one of the sheets of rubber on themselves.

3. The method according to claim 1, further comprising:
    passing one of the sheets of rubber around one of the calendering rolls upstream of the nip of the calender, wherein the at least two calendering rolls form the nip;
providing turnup means upstream of the nip, which are able to turn the lateral selvedges of at least one of the sheets of rubber up onto themselves, wherein the turnup means are formed of rotary turnup discs installed axially on each side of an equator of a calendering roll, each of the turnup discs comprising a conical surface, the generatrix of which form a given angle (.alpha.) with respect to an axis of rotation (xx') of the turnup disc, and wherein the turnup disc is installed in such a way that a radially distal part (P) of the conical surface of the turnup disc is substantially tangential to a surface of the calendering roll without coming into contact with the surface of the calendering roll;
moving the rotating turnup discs axially adjacent to each of the selvedges, so that each selvedge is lifted up by a respective turnup disc and folded over on itself towards the equator of the roll under the effect of the rotating of the turnup.

4. The method according to claim 3, further comprising:
rotationally driving the turnup discs in such a way that a tangential velocity at the radially distal part (P) of the turnup discs is directed substantially parallel to an axis (X3X3') of the calendering roll in the direction of the equator of the roll.

5. The method according to claim 3, further comprising:
rotationally driving the turnup discs in such a way that a circumferential velocity at the radially distal part (P) of the turnup discs is greater than a circumferential velocity of the calendering roll.

6. The method according to claim 1, further comprising:
cutting the lateral selvedges downstream of the nip.

7. The method according to claim 1, wherein the ply of reinforcing threads is made up of reinforcing threads that are parallel to one another and make a zero angle with respect to a longitudinal direction of the said ply.

8. The method according to claim 1, wherein the step of turning up both selvedges occurs at a specific size or position of fold.

9. The method according to claim 1, wherein each of the ply of reinforcing threads, the upper sheet of rubber, and the lower sheet of rubber is a separate layer immediately prior to introduction into the nip of the calender such that the assembly comprising the continuous ply of reinforcing threads and the sheets of rubber is formed as the separate layers travel into the nip of the calender.

* * * * *